(12) United States Patent
Chae et al.

(10) Patent No.: US 10,887,887 B2
(45) Date of Patent: Jan. 5, 2021

(54) METHOD AND APPARATUS FOR USER EQUIPMENT RECEIVING BROADCAST FEEDBACK INFORMATION TRANSMITTING MESSAGE IN WIRELESS COMMUNICATION SYSTEM

(71) Applicants: LG ELECTRONICS INC., Seoul (KR); SEOUL NATIONAL UNIVERSITY R&DB FOUNDATION, Seoul (KR)

(72) Inventors: Hyukjin Chae, Seoul (KR); Seungmin Lee, Seoul (KR); Seungil Park, Seoul (KR); Sunghyun Choi, Seoul (KR)

(73) Assignees: LG ELECTRONICS INC., Seoul (KR); SEOUL NATIONAL UNIVERSITY R & DB FOUNDATION, Seoul (KR)

( * ) Notice: Subject to any disclaimer, the term of this patent is extended or adjusted under 35 U.S.C. 154(b) by 3 days.

(21) Appl. No.: 16/338,414

(22) PCT Filed: Sep. 29, 2017

(86) PCT No.: PCT/KR2017/010963
§ 371 (c)(1),
(2) Date: Mar. 29, 2019

(87) PCT Pub. No.: WO2018/062943
PCT Pub. Date: Apr. 5, 2018

(65) Prior Publication Data
US 2020/0045705 A1 Feb. 6, 2020

Related U.S. Application Data

(60) Provisional application No. 62/403,055, filed on Sep. 30, 2016.

(51) Int. Cl.
*H04W 72/04* (2009.01)
*H04W 92/18* (2009.01)
(Continued)

(52) U.S. Cl.
CPC ...... *H04W 72/0486* (2013.01); *H04W 72/044* (2013.01); *H04W 72/0406* (2013.01); *H04W 92/18* (2013.01)

(58) Field of Classification Search
None
See application file for complete search history.

(56) References Cited

U.S. PATENT DOCUMENTS

2016/0183276 A1 6/2016 Marinier et al.
2016/0338042 A1* 11/2016 Wang ................ H04W 72/0446
(Continued)

OTHER PUBLICATIONS

PCT International Application No. PCT/KR2017/010963, Written Opinion of the International Searching Authority dated Dec. 20, 2017, 21 pages.

(Continued)

*Primary Examiner* — Jay L Vogel
(74) *Attorney, Agent, or Firm* — Lee Hong Degerman Kang Waimey

(57) ABSTRACT

One embodiment of the present invention relates to a method for user equipment receiving broadcast feedback information transmitting a message in a wireless communication system, the method for user equipment receiving broadcast feedback information transmitting a message
(Continued)

comprising the steps of: broadcasting a first message from a first resource; receiving, from a plurality of user equipment which have received the broadcast, information relating to resource use of the first resource; determining whether to perform resource reselection from resource use of the first resource received from the plurality of user equipment; and transmitting a second message using a reselected resource when the resource reselection is to be performed, wherein the information relating to resource use is a status value corresponding to the number of user equipment using the first resource.

4 Claims, 10 Drawing Sheets

(51) Int. Cl.
*H04W 48/12* (2009.01)
*H04W 8/00* (2009.01)
*H04W 72/02* (2009.01)

(56) References Cited

U.S. PATENT DOCUMENTS

2017/0357788 A1* 12/2017 Ledvina .................. G06F 21/31
2018/0103490 A1* 4/2018 Li ........................ H04W 74/085
2019/0132832 A1* 5/2019 Uchiyama ............. H04W 72/10

OTHER PUBLICATIONS

Intel, "Sidelink measurements for V2V sensing and resource reselection procedures", 3GPP TSG RAN WG1 Meeting #86, R1-166511, Aug. 2016, 5 pages.

Huawei, et al., "Details of sensing procedure and resource (re)selection triggering mechanisms", 3GPP TSG RAN WG1 Meeting #86, R1-166169, Aug. 2016, 6 pages.

Intel, "Transmitter behavior for sidelink resource (re)selection", 3GPP TSG RAN WG1 Meeting #86, R1-166512, Aug. 2016, 6 pages.

Sony, "Discussion on triggering resource reselection based on collision detection", 3GPP TSG RAN WG1 Meeting #86, R1-167076, Aug. 2016, 5 pages.

* cited by examiner

FIG. 5
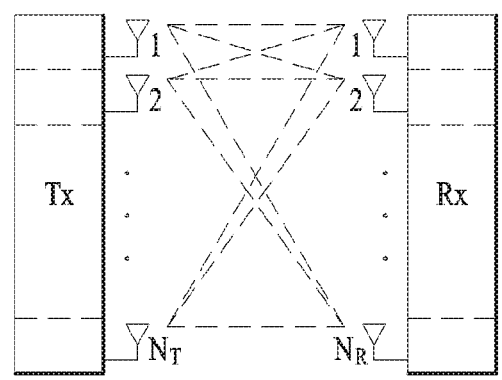
(a)
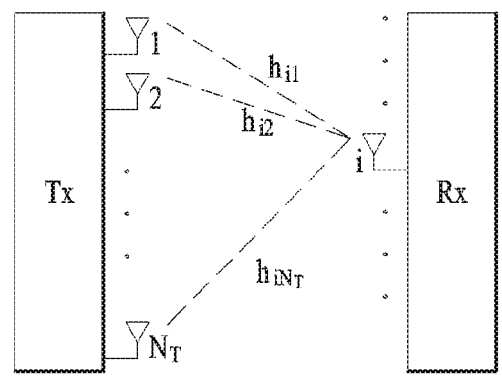
(b)

FIG. 8
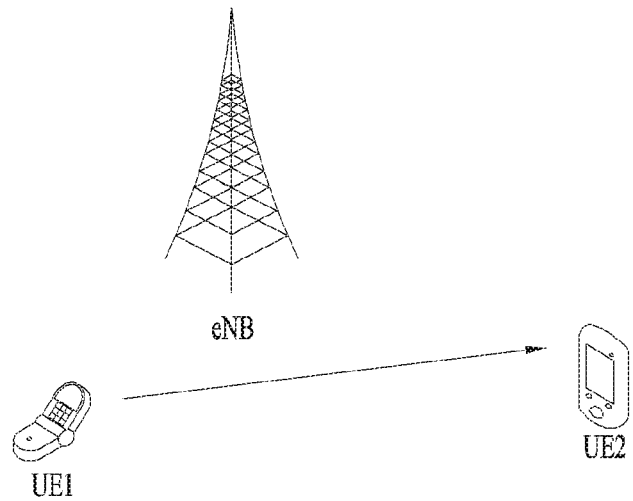
(a)
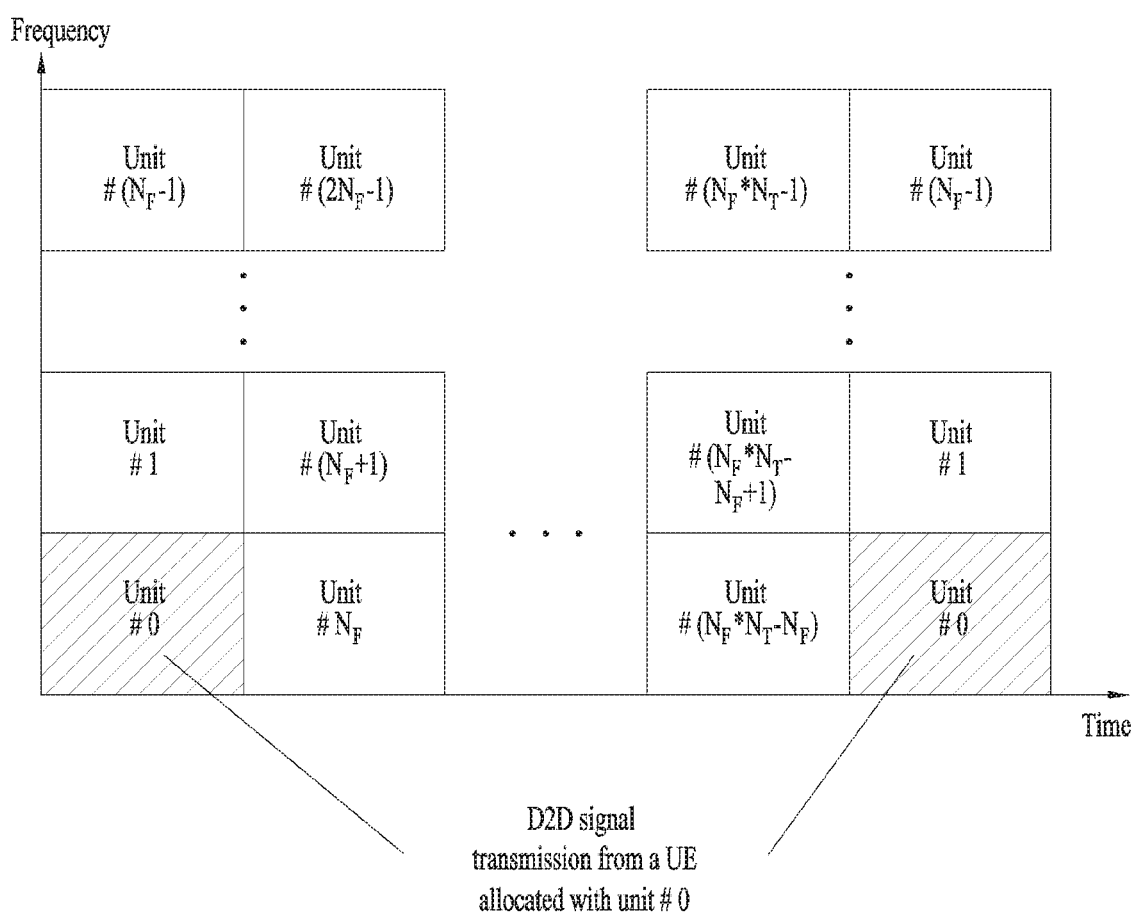
(b)

| $F_B$ | Meaning | |
|----|----|----|
| 00 | If no UE uses the resource | → F = 0 |
| 01 | If single UE uese the resource & mod(tx_id + rx_id, 2) == 0 | → F = 1 or 3 |
| 10 | If single UE uese the resource & mod(tx_id + rx_id, 2) == 1 | |
| 11 | If more than one UEs use the resource | → F = 2 |

METHOD AND APPARATUS FOR USER EQUIPMENT RECEIVING BROADCAST FEEDBACK INFORMATION TRANSMITTING MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2017/010963, filed on Sep. 29, 2017, which claims the benefit of U.S. Provisional Application No. 62/403,055, filed on Sep. 30, 2016, the contents of which are all hereby incorporated by reference herein in their entireties.

TECHNICAL FIELD

The following description relates to a wireless communication system, and more particularly, to a method for transmitting a message of a user equipment (UE) for receiving broadcast feedback information and an apparatus for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present invention is to provide a feedback method for a broadcast message and a resource selection method based on the feedback method.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for allowing a user equipment (UE), which receives broadcast feedback information, to transmit a message in a wireless communication system comprises the steps of broadcasting a first message on a first resource; receiving, from a plurality of UEs which have received the broadcast, information whether to use resource for the first resource; determining whether to perform resource reselection from the resource use for the first resource received from the plurality of UEs; and transmitting a second message by using a reselected resource when it is determined to perform the resource reselection, wherein the information whether to use resource for the first resource is a state value corresponding to the number of UEs which use the first resource.

In one embodiment of the present invention, a UE for receiving broadcast feedback information and transmitting a message in a wireless communication system comprises a transmitting module and a receiving module; and a processor, wherein the processor broadcasts a first message on a first resource, receives, from a plurality of UEs which have received the broadcast, information whether to use resource for the first resource, determines whether to perform resource reselection, from the resource use for the first resource received from the plurality of UEs, and transmits a second message by using a reselected resource when it is determined to perform the resource reselection, and the information whether to use resource for the first resource is a state value corresponding to the number of UEs which use the first resource.

The determination as to whether to perform the resource reselection may be to compare whether a sum value of all kinds of the information whether to use resource for the first resource received from the plurality of UEs is greater than a preset value.

A threshold value when the UE which has received the first message has a plurality of antennas may be greater than a threshold value when the UE which has received the first message has a single antenna.

The UE may perform resource reselection when the sum value of all kinds of the information whether to use resource for the first resource received from the plurality of UEs is greater than the preset value.

The state value corresponding to the number of UEs which use the first resource may be 0 when it is determined that the first resource is not used, 1 when it is determined that the first resource is used by one UE, or 2 when it is determined that the first resource is used by two or more UEs.

The state value corresponding to the number of UEs which use the first resource may be 00 when it is determined that the first resource is not used, 01 when it is determined that the first resource is used by one UE and a computation value based on a signal received from the first resource is 0, 10 when it is determined that the first resource is used by one UE and a computation value based on the signal received from the first resource is 1, or 2 when it is determined that the first resource is used by two or more UEs.

The computation value based on the signal may be a value of modulo computation performed for ID of the UE which has transmitted each received signal.

Advantageous Effects

According to the present invention, resource selection may be performed more efficiently using feedback information on a broadcast message.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE FOR CARRYING OUT THE INVENTION

Figure 1:
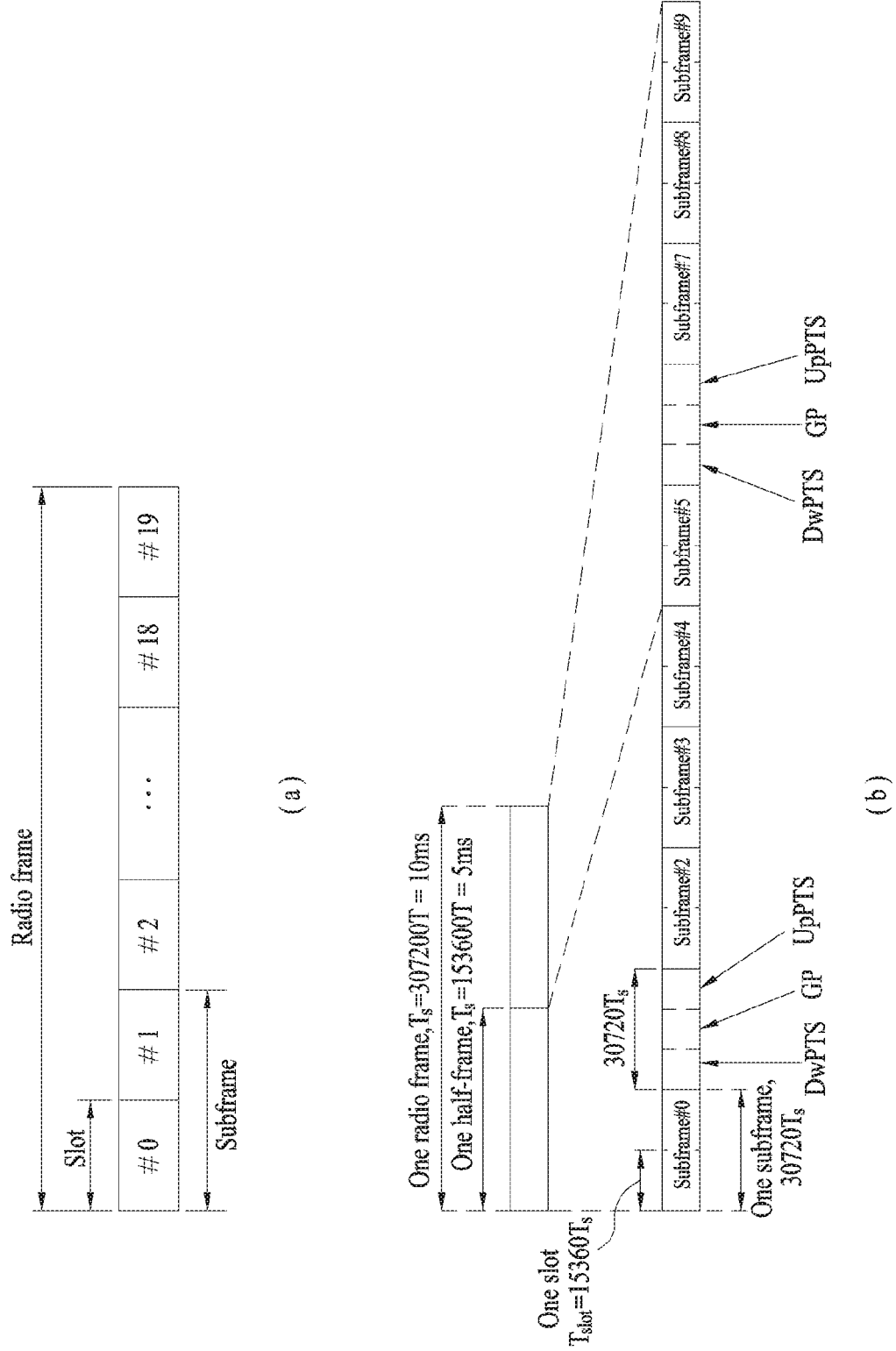
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts 01-DMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
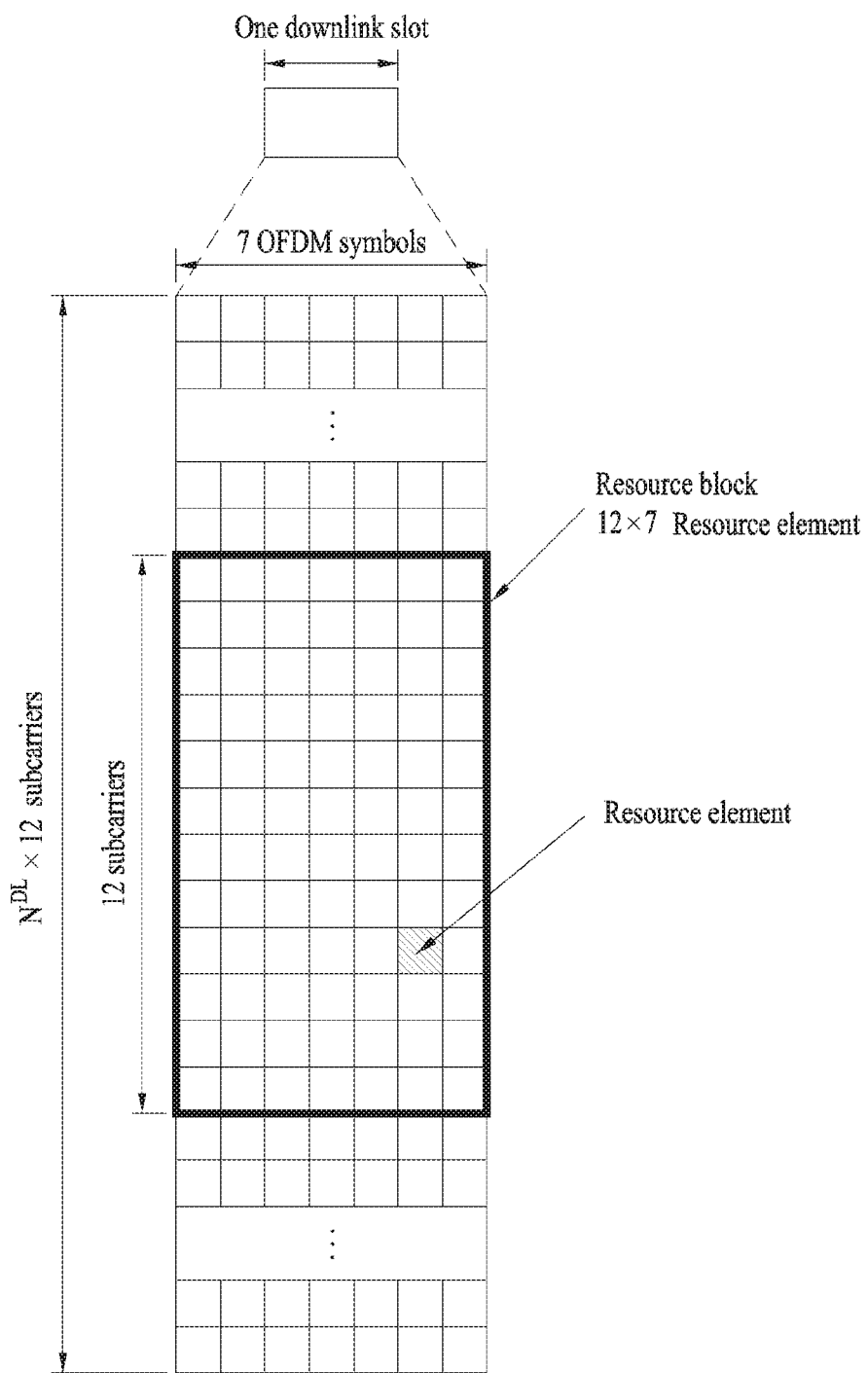
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
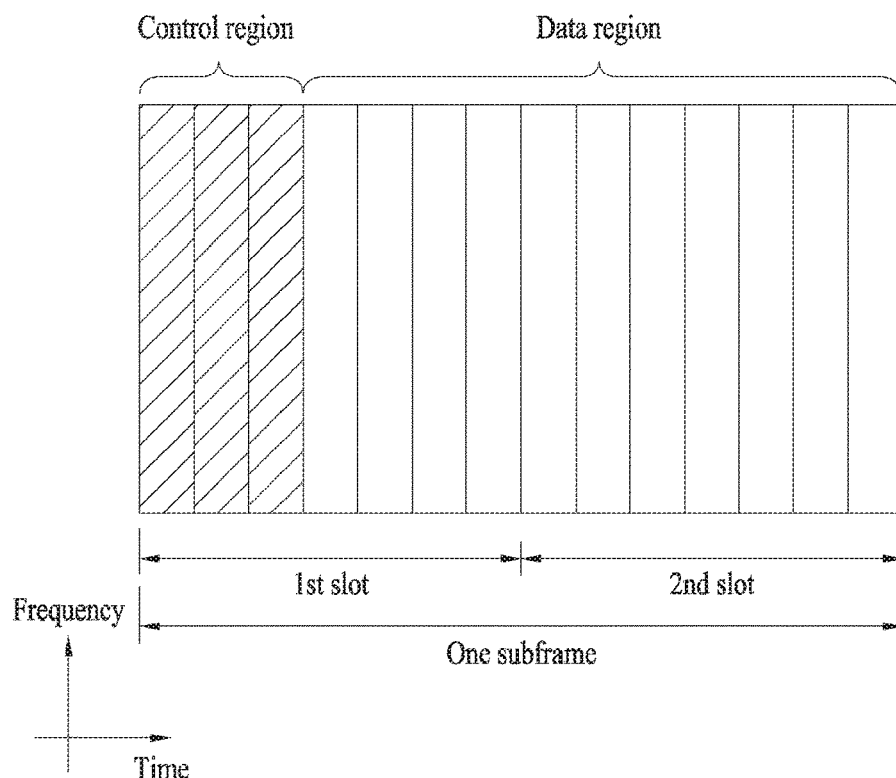
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
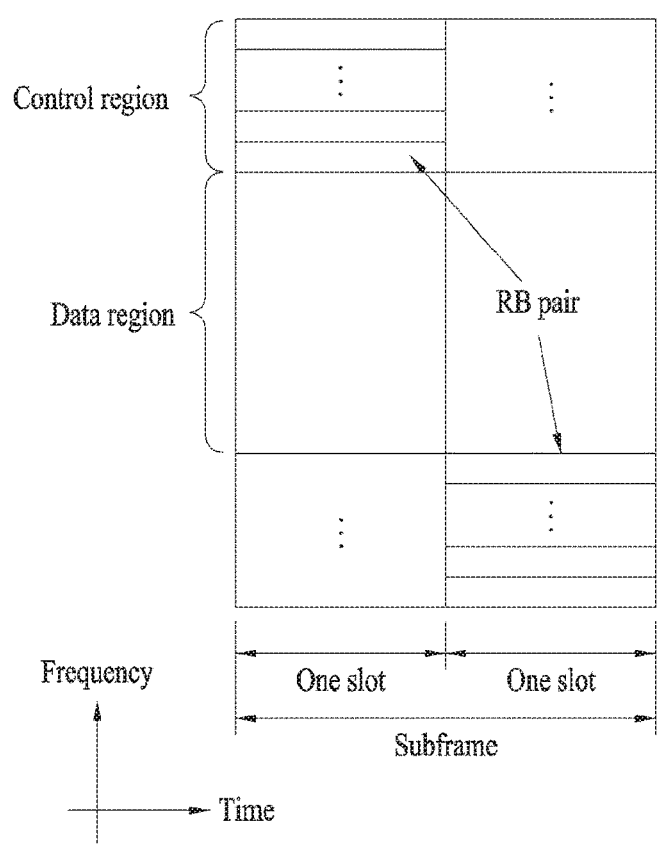
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
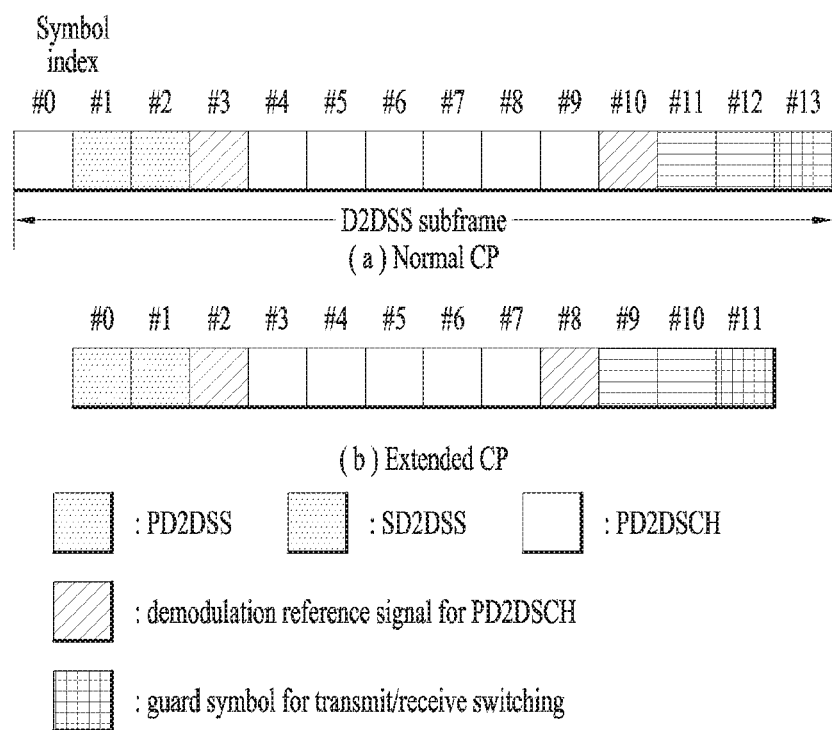
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
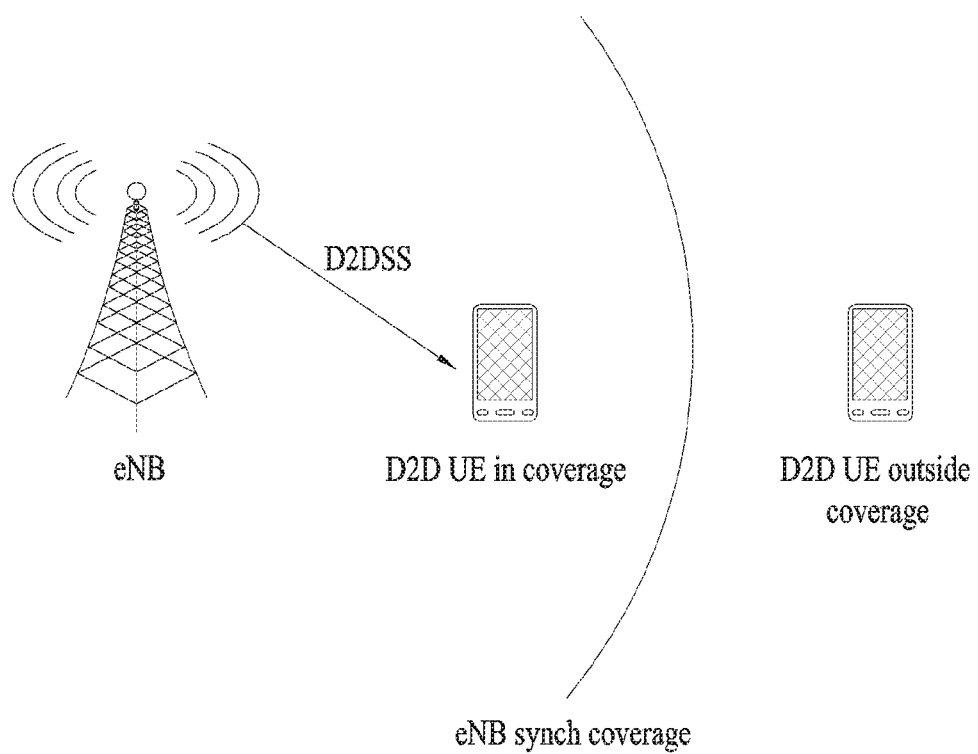
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
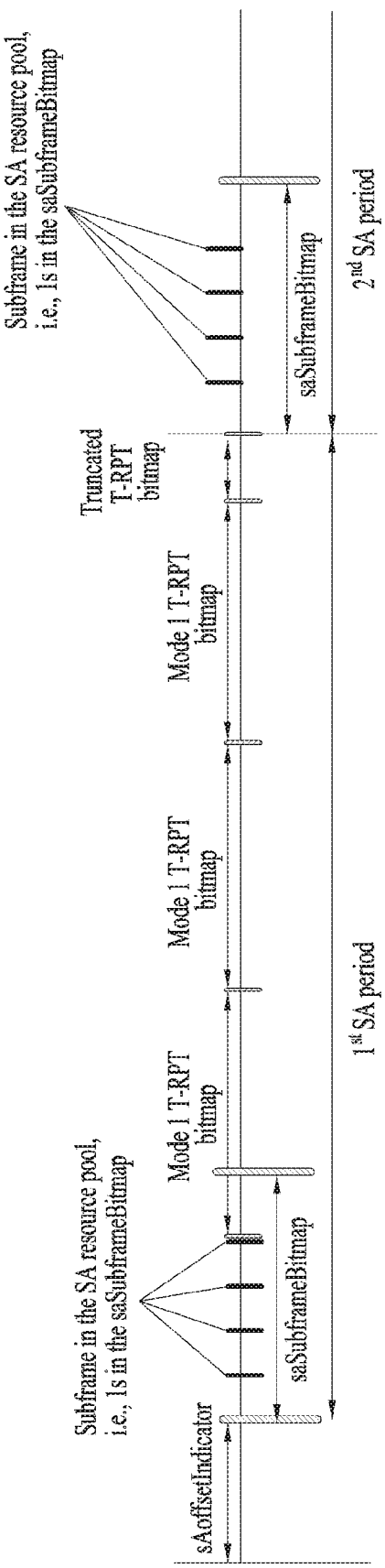
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

Meanwhile, in V2V (vehicle-to-vehicle) communication, a CAM (Cooperative Awareness Message) of a periodic message type, a DENM (Decentralized Environmental Notification Message) of an event triggered message type and the like may be transmitted. The CAM may include basic vehicle information such as vehicle dynamic status information like direction and speed, vehicle static data like dimension, status of exterior lights, and path history. The size of CAM message may be between 50 Bytes and 300 Bytes. The DENM may be broadcast, and latency should be smaller than 100 ms. The DENM may correspond to a message which is generated when such an unexpected situation as a malfunction of a car, an accident, and the like occurs. The size of DENM may be smaller than 3000 Bytes. All cars within the transmission range may receive the message. In this case, the DENM may have a priority higher than a priority of the CAM. In this case, when a message has a higher priority, it means that the message of the higher priority is preferentially transmitted in view of one UE when messages are transmitted at the same time. Alternatively, it means that the message of the higher priority is preferentially transmitted in time among a plurality of messages. In view of a plurality of UEs, it may be able to make the message of the higher priority receive less interference compared to a message of a lower priority to reduce a reception error probability. If security overhead is included in the CAM, the CAM may have a bigger message size.

In View of UE which Receives Feedback

A UE may broadcast a first message on a specific resource (first resource) and receive information whether to use resource for the first resource and state information on the resource from a plurality of UEs which have received the broadcast message. If the UE determines to perform resource reselection by determining whether to perform resource reselection from the information (or state information) as to whether to use the first resource, which is received from the plurality of UEs, the UE may transmit a second message by using the reselected resource. In this case, the information as to whether to use the resource may be a state value (value F) corresponding to the number of UEs which use the first resource, and determination as to whether to perform the resource reselection may compare that a sum value of the information whether to use resource for the first resource, which is received from the plurality of UEs, is greater than a preset value.

As a result of comparison, if the sum value of the information whether to use resource for the first resource, which is received from the plurality of UEs, is greater than a preset threshold value, the UE may perform resource reselection. In this case, the threshold value may be determined considering the number of antennas of the UE, a transmission power used, by the UE, for message transmission, retransmission times, etc. This may be delivered to the UE through UE implementation or a physical layer/higher layer signal. For example, a threshold value when the UE which has received the first message has a plurality of antennas may be greater than a threshold value when the UE which has received the first message has a single antenna. This is because that the possibility of resource collision may be lowered as much as the increased number of layers when the UE has a plurality of antennas. Also, the threshold value may be set to an nth high value among state values received for all resources. Alternatively, when the UE has a plurality of antennas, information as to whether to use the resource may be expressed per layer and signaled. At this time, information as to whether resource collision occurs may separately be expressed per layer, and resource reselection may be performed if a sum of the information as to whether to use the resource per layer exceeds a threshold value.

A state value corresponding to the number of UEs which use the first resource may be 0 when it is determined that the first resource is not used, 1 when it is determined that the first resource is used by one UE, or 2 when it is determined that the first resource is used by two or more UEs.

For another example, the state value corresponding to the number of UEs which use the first resource may be 00 when it is determined that the first resource is not used, 01 when it is determined that the first resource is used by one UE and a computation value based on the signal received from the first resource is 0, 10 when it is determined that the first resource is used by one UE and a computation value based on the signal received from the first resource is 1, or 2 when it is determined that the first resource is used by two or more UEs. In this case, the computation value based on the signal may be a value of modulo computation performed for ID of the UE which has transmitted each received signal.

Examples of the above two detailed state values will be described in detail in the embodiment in view of the UE which transmits feedback information, which will be described later.

Subsequently, if the UE selects resource reselection, new resources may be selected based on values F for all resources by a predefined rule or a rule determined by a network. At this time, use of the values F through feedback may expect that sensing coverage is increased in view of the aspect that the UE uses a sensing result of a signal from a maximum 2-hop distance instead of using only a sensing result of a signal existing within 1 hop. That is, through this method, a hidden node problem occurring in a transmitter through sensing may be alleviated or solved. For example, a method for setting an mth low value among values F received for all resources to a threshold value and randomly selecting a resource among resources lower than the threshold value may be used.

In View of UE which Transmits Feedback Information,

Determination as to Whether Use/Collision of Specific Resources Occurs

A UE which has received a unicast or broadcast signal of another UE may determine whether collision of specific resources occurs by the following various methods and feed the determined result back to the UE which has transmitted the signal.

Each UE may identify whether use/collision of another resources occurs, through a physical layer signal or higher layer signal and transmit the identified result.

Each UE may identify whether use/collision of the corresponding resources occurs, through a measured result of energy level detected from each resource and information as to whether to receive a specific message from the corresponding resources. For example, if energy of specific resources is measured to be less than the threshold value, it may be determined that there is no UE which uses the corresponding resources, and if information is normally received in the corresponding resources, it may be determined that the resources may be used by one specific UE. Also, if high energy is measured but message reception is failed, it may be regarded that collision has occurred in the corresponding resources.

As another method, collision may be determined in view of Signal-to-Interference-plus-Noise Ratio (SINR). The SINR may be calculated by RS received power from a specific UE. If a received power of a signal is measured at high level but SINR size is less than a certain threshold value, it may be regarded that resource collision has occurred.

As still another method, collision of resources may be identified through decoding of a control signal and/or RS received power measurement/energy measurement/SINR measurement of a data signal. After decoding of the control signal, if (all or some of) positions of data resources indicated by the control signal (this may mean that the control signal has been successfully decoded, and if all or some of data resources indicated by a UE which has successfully decoded the control signal are equal to one another, it may be regarded that collision of the resources has occurred) are overlapped with positions of data resources indicated by a control signal transmitted from another UE, it may be regarded that resource collision has occurred in the corresponding data resources. Moreover, collision of resources may be determined by measurement of received power, energy, SINR, etc. of RS from the data resources indicated by the control signal. For example, if two different control signals indicate same data resources when the control signal is decoded, RS received power may be measured from the corresponding resources. In this case, if RS received powers of data signals transmitted from two different UEs exceed a certain threshold, it may be regarded that collision has occurred in the corresponding resources. That is, instead of simply using resource collision in the data resources, collision of the corresponding resources is determined only if the control signal is successfully decoded. Threshold values used for use/collision of the resources may previously be determined or signaled by the network through physical layer or higher layer signal.

Method for Expressing/Reporting Use/Collision of Specific Resources

UEs which have determined collision of specific resources with respect to at least one or more of the aforementioned methods may feed collision/use of the specific resources back as a state value having a specific meaning. That is, the UEs may express use/collision of resources in each unit time and frequency resources as N states and signal this value to another UE through a physical layer or higher layer signal.

For example, in a single antenna system, no state may be defined if it is determined that specific resources are not used, 1(one) state may be defined if it is determined that specific resources are used by one UE, and 2(two) states may be defined if it is determined that specific resources are used by two or more UEs (or if collision occurs as the specific resources are used by two or more UEs), whereby it may indirectly imply that a large number of users use the corresponding resources if the value of the states is high. Alternatively, SINR of specific resources may be expressed as N states. For example, the SINR may be subjected to quantization by N states and then signaled to another UEs.

Considering a multi-antenna system, if the number of antennas of a receiving UE is N, maximum N signals of different UEs may be recovered in the same resource. Therefore, the state may be defined by being more segmented. For example, since 1 to N UEs are capable of performing simultaneous transmission in the same resources, 0 may be defined if no UE uses the corresponding resources, 1 to N states may be defined if the corresponding number of UEs use the corresponding resources, and N+M states (M is a specific value given in the system, for example, M=1) may be defined, whereby a total of N+2 states may be defined.

However, when one UE uses specific resources as above, a hidden node problem (or hidden collision problem) may be issued if the value F is expressed as 1. In detail, referring to the example of FIG. 10, UE A and UE C may use resource 10 at the same time, and only specific UEs (UEs B and C in FIG. 10) may join a feedback for the corresponding resources. At this time, since the UE B is close to the UE A, the UE B may successfully receive a signal of the UE A by processing a signal of the UE C as interference of relatively low intensity. For the same reason, UE D may successfully receive the signal from the UE C. Since feedback results of the resource 10 which is used by the UE C are all values of F=1, the UE C may determine that there is no problem in the resource 10. That is, the UE C may determine that only the UE C uses the resource 10 in view of the UEs B and D, for each feedback result of F=1. In this case, the resources of the UE C may collide with resources of the UE A, which are equal to those of the UE C.

Considering this, a unique value (for example, ID of the UE) of the UE may be used for the state, and when the UE which has received a signal transmits the same result as a feedback, the UE which has received this feedback may extend this feedback value to a plurality of states to process the feedback value by using a different value F. As described above, a state value corresponding to the number of UEs which use the first resource may be 00 when it is determined that the first resource is not used, 01 when the first resource is used by one UE and a computation value based on the signal received from the first resource is 0, 10 when the first resource is used by one UE and a computation value based on the signal received from the first resource is 1, and 2 when the first resource is used by two or more UEs. In this case, the computation value based on the signal may be a value obtained by modulo computation performed for ID of the UE which has transmitted each received signal.

Figures 10, 11:
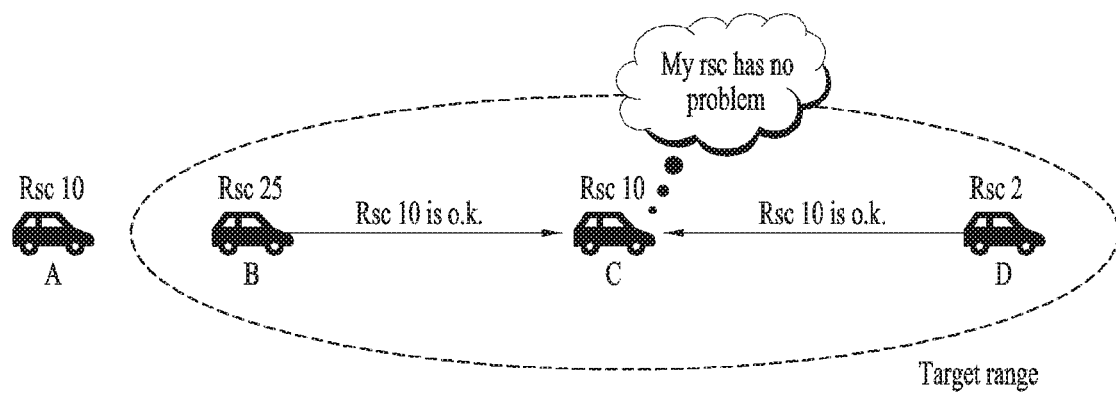
FIGS. 10 and 11 are views illustrating the embodiment of the present invention.

That is, as illustrated in FIG. 10, if a result of computation performed using id of a data transmitting UE and id of a data receiving UE is categorized into k types (k=2 in FIG. 2) and a state is extended to k states (01 and 10 in the drawing) in accordance with the categorized result, although a feedback value F received for resources used by the UE is 1, the UE actually receives a signal of another UE successfully and transmits a feedback to another UE. This status may be referred to as a hidden node problem. This hidden node problem may be identified stochastically. In case of k=2, this hidden node problem may be recognized at a probability of 50%. Therefore, since F is recognized as 1 when the above status is not recognized, the value of F may be increased (F is calculated as 3 if k=2) when the above status is recognized, whereby it may be designed such that an average value of F may be 2 in a state that collision occurs as above. At this time, a time-varying value (for example, system number) may be added to id computation of the UE such that a feedback even received from the same UE may be mapped into a different state every time.

Meanwhile, the UE may control a size of overhead (information used for feedback) in accordance with a condition given in the system, and whole system throughput may be varied depending on the size of overhead. For example, if the UE is restricted by the system to use a feedback of 20 bits only, since information required for feedback per resource in the above example is 2 bits, each UE may feed only 10 resources back. In this case, the UE may determine resources to be fed back in accordance with a predefined rule.

Meanwhile, the UE may transmit a state (or value of F) indicating use/collision of resources as a feedback. At this time, the UE may use a predetermined default value to indicate how many resources are transmitted as a feedback, or the network may designate the number of resources to be used as a feedback.

In the aforementioned description, if the UE starts to transmit a message, the UE may maintain resources selected for a certain time period. For example, UEs may transmit the CAM or the DENM periodically or non-periodically. When periodically transmitting a message, the UE may transmit the message by including all or some of its sensed result in a physical layer signal or higher layer signal. As a detailed example, the UE may transmit the message, which includes information as to whether collision of specific resources has occurred, to a higher layer field. In a feedback system as to collision of resources, it may be assumed that the UE does not change resources selected once unless a specific condition occurs. This is to allow the UEs to stably perform transmission and reception by reducing randomness in interference estimation by changing the resources for only UEs which currently have a problem in resource selection.

The aforementioned descriptions are not limited to D2D communication only, and may be applied to an uplink or a downlink. At this time, the above suggested method may be used by an eNB, a relay node, or the like.

Since each of the examples suggested as above may be included in one of the implementation methods of the present invention, it will be apparent that the examples may be regarded as the suggested methods. Also, although the methods suggested as above may be implemented independently, some of the methods suggested as above may be implemented in combination (or corporation). A rule may be defined such that information as to application of the methods suggested as above (information as to rules of the methods suggested as above) may be notified from the eNB to the UE through a predefined signal (e.g., physical layer signal or higher layer signal), or may be signaled from a transmitting UE to a receiving UE or requested from the receiving UE to the transmitting UE.

Apparatus Configurations According to Embodiments of the Present Invention

Figure 12:
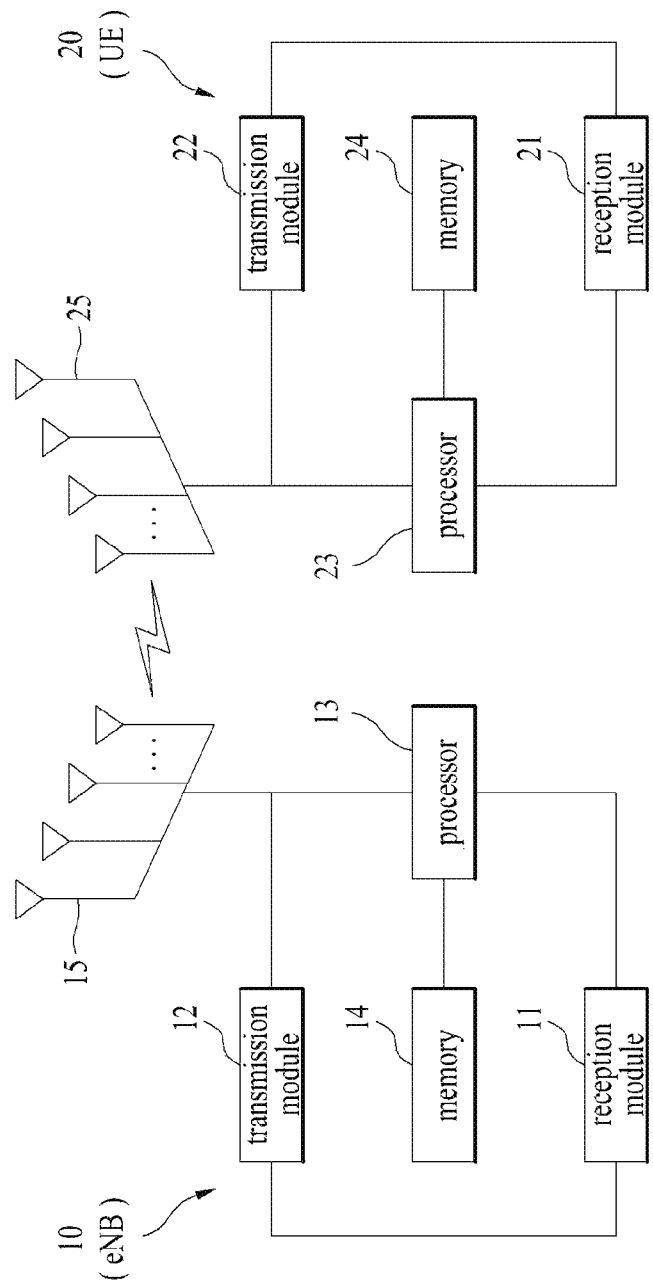
FIG. 12 is a view illustrating a configuration of a transceiving apparatus.

FIG. 12 is a view illustrating configurations of a transmission point apparatus and a UE apparatus according to the embodiment of the present invention.

Referring to FIG. 12, a transmission point apparatus 10 may include a receiving module 11, a transmitting module 12, a processor 13, a memory 14, and a plurality of antennas 15. The plurality of the antennas 15 may mean that the transmission point apparatus supports MIMO transmission and reception. The receiving module 11 may receive various signals, data and information on an uplink from a UE. The transmitting module 12 may transmit various signals, data and information on a downlink to the UE. The processor 13 may control overall operation of the transmission point apparatus 10.

The processor 13 of the transmission point apparatus 10 according to one embodiment of the present invention may perform the processes required in the above-described embodiments.

In addition, the processor 13 of the transmission point apparatus 10 may perform a function of processing information received by the transmission point apparatus 10, information to be transmitted to the outside by the transmission point apparatus 10, and the like. The memory 14 may store the processed information for a predetermined time period and be replaced with a component such as a buffer (not shown) or the like.

Subsequently, referring to FIG. 12, a UE apparatus 20 may include a receiving module 21, a transmitting module 22, a processor 23, a memory 24, and a plurality of antennas 25. The plurality of antennas 25 may mean that the UE apparatus supports MIMO transmission and reception. The receiving module 21 may receive various signals, data and information on a downlink from an eNB. The transmitting module 22 may transmit various signals, data and information on an uplink to the eNB. The processor 23 may control overall operation of the UE apparatus 20.

The processor 23 of the UE apparatus 20 according to one embodiment of the present invention may process matters required for the above-described embodiments. In detail, the processor may receive PSCCH (Physical sidelink control channel) and PSSCH transmitted from a resource region indicated by the PSCCH through the receiving module, and may select a transmission resource except the resource region, to which the PSSCH is transmitted, if an energy measurement value for the PSSCH is greater than a preset threshold value, and may transmit a D2D signal by using the selected transmission resource through the transmitting module.

The threshold value has different values depending on whether the PSSCH corresponds to retransmission or a redundancy version (RV) of the PSSCH. In addition, the processor 23 of the UE apparatus 20 may perform a function of processing information received by the UE apparatus 20, information to be transmitted to the outside by the UE apparatus 20, and the like. The memory 24 may store the processed information for a predetermined time period and be replaced with a component such as a buffer (not shown) or the like.

The configurations of the transmission point apparatus and the UE apparatus may be implemented such that the above-described embodiments may be independently applied or two or more embodiments may simultaneously be applied, and redundant description will be omitted for clarity.

The description of the transmission point apparatus 10 in FIG. 12 may equally be applied to a relay as a downlink transmission entity or an uplink reception entity, and the description of the UE apparatus 20 in FIG. 12 may equally be applied to a relay as a downlink reception entity or an uplink transmission entity.

The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present invention are applicable to various mobile communication systems.

What is claimed is:

1. A method for transmitting a message by a wireless communication device in a wireless communication system, the method comprising:
   broadcasting a first message on a first resource;
   receiving, from a plurality of user equipments (UEs) which have received the broadcasted first message, respective feedback information including a value related a number of UEs which use the first resource;
   determining that a sum of all the values in all the respective feedback information is greater than a threshold value;
   performing a resource reselection; and
   transmitting a second message by using a reselected resource obtained via the resource reselection,
   wherein the value in the respective feedback information is set to one of a plurality of state values, the plurality of state values including:
   (i) a first value for indicating that that the first resource is not used,
   (ii) a second value for indicating that the first resource is used by one UE, and
   (iii) a third value for indicating that the first resource is used by two or more UEs.

2. The method according to claim 1,
   wherein the threshold value depends on a number of antennas used configured in the wireless communication device, and
   wherein a first threshold value for multi-antenna is greater than a second threshold value for a single antenna.

3. The method according to claim 1, wherein the first value is '0, the second value is '1' and the third value is '2'.

4. A wireless communication device comprising:
   a transceiver; and
   a processor, wherein the processor:
   broadcasts a first message on a first resource,
   receives, from a plurality of user equipments (UEs) which have received the broadcasted first message, respective feedback information including a value related to a number of UEs which use the first resource,
   determines that a sum of all the values in all the respective feedback information is greater than a threshold value,
   performs a resource reselection, and
   transmits a second message by using a reselected resource obtained via the resource reselection, and
   wherein the value in the respective feedback information is set to one of a plurality of state values, the plurality of state values including:
   (i) a first value for indicating that that the first resource is not used,
   (ii) a second value for indicating that the first resource is used by one UE, and
   (iii) a third value for indicating that the first resource is used by two or more UEs.

* * * * *